United States Patent
Azuma

(10) Patent No.: US 9,641,203 B2
(45) Date of Patent: May 2, 2017

(54) WIRELESS MODULE

(71) Applicant: ALPS ELECTRIC CO., LTD., Tokyo (JP)

(72) Inventor: Toshiyuki Azuma, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 282 days.

(21) Appl. No.: 14/251,287

(22) Filed: Apr. 11, 2014

(65) Prior Publication Data

US 2015/0022418 A1    Jan. 22, 2015

(30) Foreign Application Priority Data

Jul. 18, 2013 (JP) ................................ 2013-149509

(51) Int. Cl.
*H01Q 1/36* (2006.01)
*H04B 1/04* (2006.01)
*H04B 1/18* (2006.01)
*H04B 1/525* (2015.01)

(52) U.S. Cl.
CPC ......... *H04B 1/0458* (2013.01); *H04B 1/0475* (2013.01); *H04B 1/18* (2013.01); *H04B 1/525* (2013.01)

(58) Field of Classification Search
USPC .................. 343/850, 700 MS, 702, 785, 895
See application file for complete search history.

(56) References Cited

U.S. PATENT DOCUMENTS

| | | | | |
|---|---|---|---|---|
| 8,013,794 B2 * | 9/2011 | Sotoma | ................ | H01Q 1/243 343/700 MS |
| 2005/0243001 A1 * | 11/2005 | Miyata | ................ | H01Q 1/243 343/702 |
| 2010/0066615 A1 * | 3/2010 | Okayama | ............... | H01Q 1/243 343/702 |
| 2010/0097272 A1 * | 4/2010 | Kim | ...................... | H01Q 1/243 343/700 MS |
| 2011/0080330 A1 * | 4/2011 | Lee | ......................... | H01Q 1/38 343/785 |

FOREIGN PATENT DOCUMENTS

JP          8-78934          3/1996

* cited by examiner

*Primary Examiner* — Hoang Nguyen
*Assistant Examiner* — Hai Tran
(74) *Attorney, Agent, or Firm* — Beyer Law Group LLP

(57) ABSTRACT

A wireless module includes a wireless module main body including a first antenna on a first insulating substrate, and a coupler including a second antenna on a second insulating substrate arranged so as to face the first insulating substrate, wherein a connection terminal to which an external antenna is connectable is formed in the second insulating substrate, the connection terminal being connected to a feeding point for the second antenna, individual portions of the conductor patterns in the first antenna and the second antenna are configured so as to face each other, a resonant frequency of the second antenna is set to be higher than a resonant frequency of the first antenna, and the resonant frequency of the second antenna is set so that a transmission frequency characteristic from the first antenna to the second antenna matches a frequency characteristic of the resonant frequency of the first antenna.

12 Claims, 8 Drawing Sheets

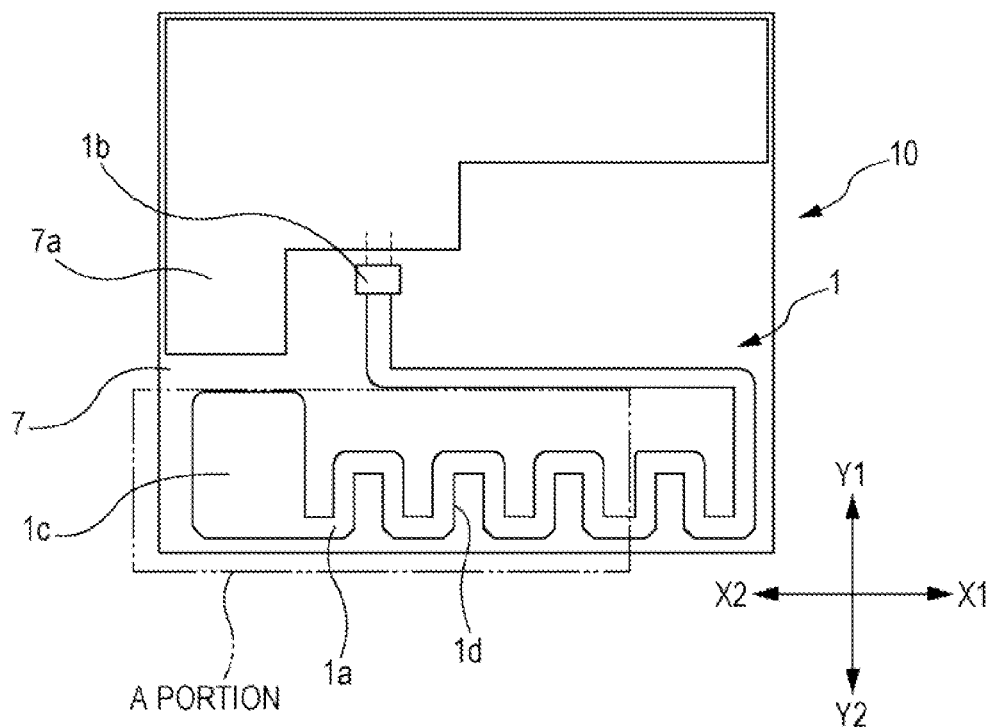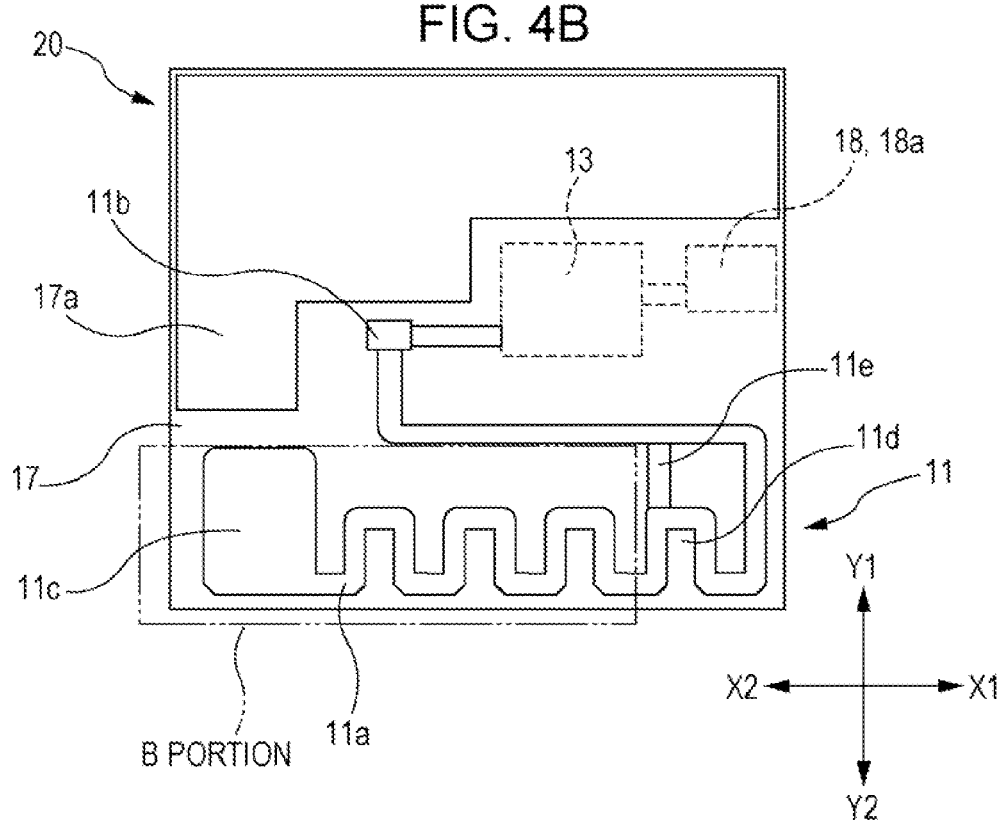

FIG. 5
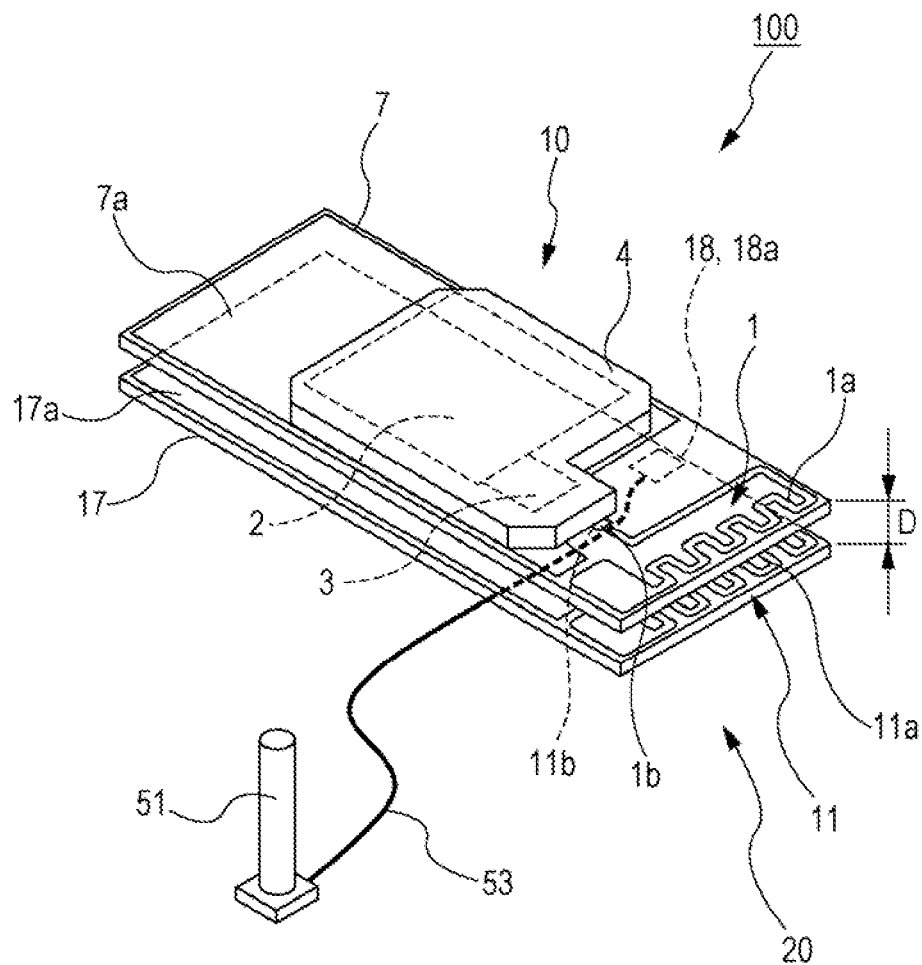
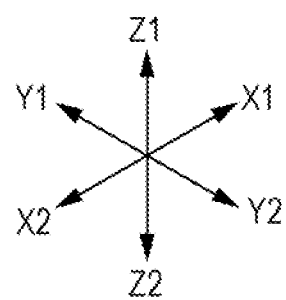

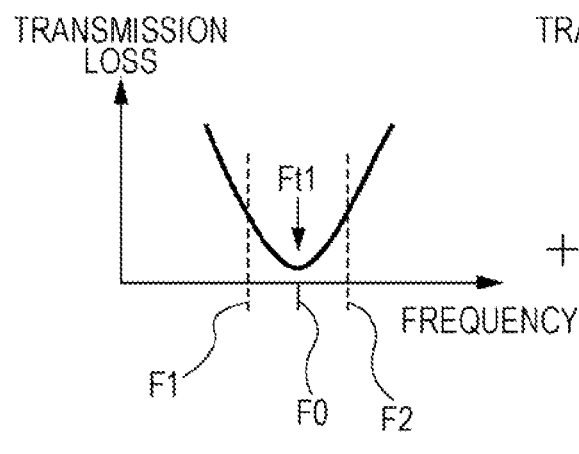 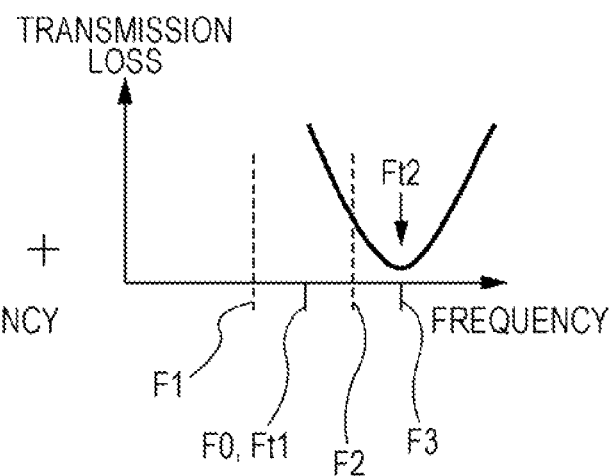
FIG. 7A  FIG. 7B
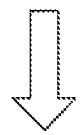
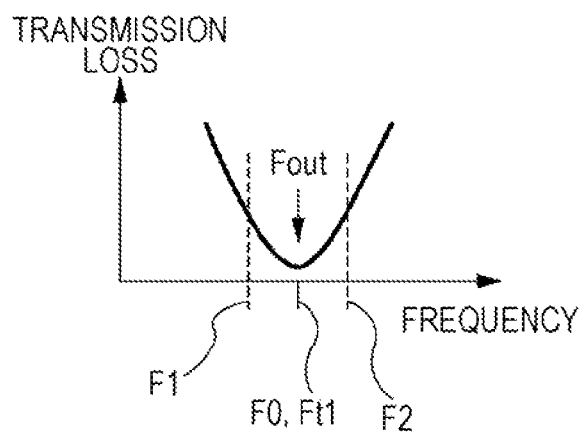
FIG. 7C

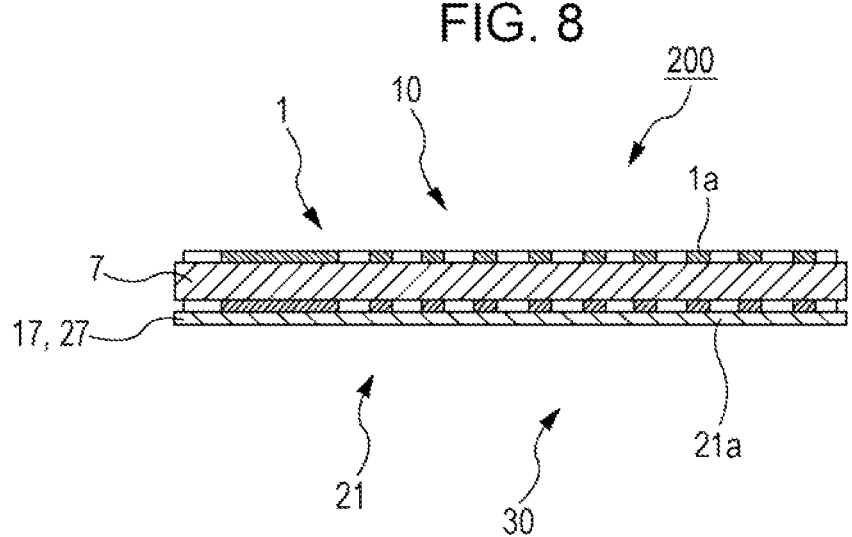
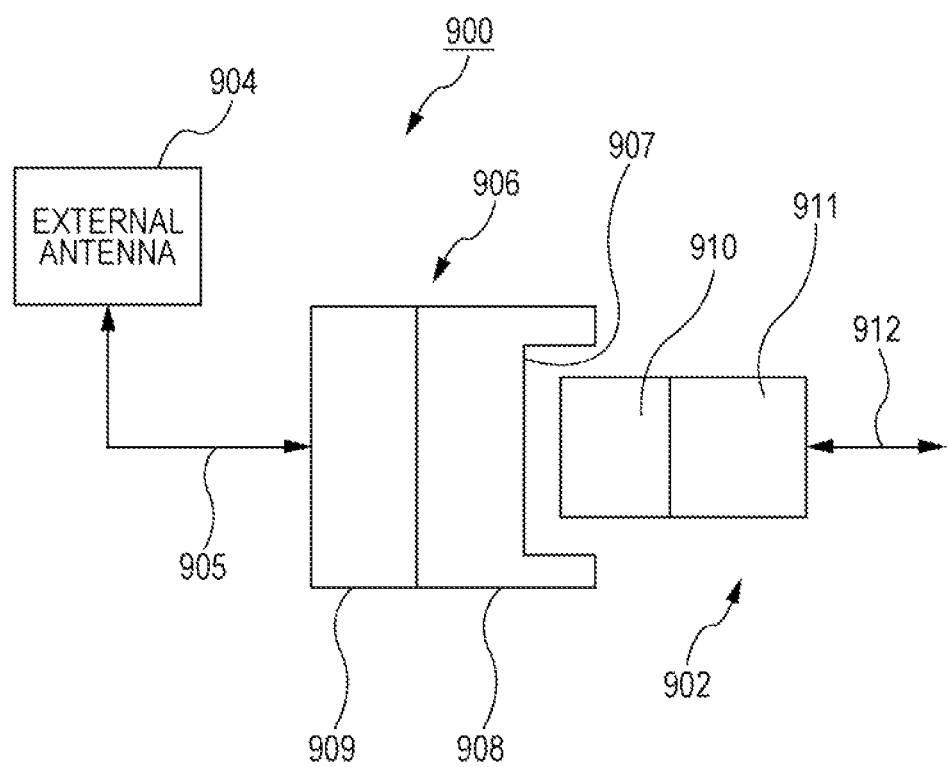

WIRELESS MODULE

CLAIM OF PRIORITY

This application claims benefit of Japanese Patent Application No. 2013-149509 filed on Jul. 18, 2013, which is hereby incorporated by reference.

BACKGROUND OF THE INVENTION

1. Field of the Invention

The present invention relates to a wireless module, and in particular relates to an antenna-integrated wireless module.

2. Description of the Related Art

The antenna-integrated wireless module is a wireless module in which an antenna and a wireless communication circuit are configured so as to be integrated with each other, and, for example, a device used for transmitting and/or receiving a signal of a several GHz band, such as a wireless LAN device or a Bluetooth (registered trademark) device. While the antenna-integrated wireless module is configured so as to perform communication using the antenna within the module, an antenna-integrated wireless module is configured so that an external antenna is usable as necessary.

In order to make the external antenna usable, it may be considered that an attachable and detachable coaxial connector is used. However, since the attachable and detachable coaxial connector is expensive, there has been a problem that a production cost of the antenna-integrated wireless module is increased. Therefore, there has been proposed an antenna-integrated wireless module that makes the external antenna usable without using the attachable and detachable coaxial connector.

Based on FIG. 9, an example of an antenna-integrated wireless module of the related art will be described that makes the external antenna usable without using the attachable and detachable coaxial connector. In an antenna extension device 900, an external antenna 904 is connected to a coupler 906 through a coaxial cable 905, a groove is formed in the coupler 906, the groove is made able to be fitted in and detached from an end portion of a card-type transceiver 902, and an electric coupling portion 908 and a matching portion 909 are provided in the coupler 906. In addition, a configuration is adopted where the coupler 906 is made able to be electrically coupled to a built-in antenna 910 in the card-type transceiver 902 through the electric coupling portion 908 and a transmission or reception signal is output from or input to an information processing device through an interface bus 912.

Using such a configuration, in a case where the antenna extension device 900 is connected to the card-type transceiver 902, it is only necessary to simply plug and fit the coupler 906 into the card-type transceiver 902 without performing a connection switch operation based on the coaxial cable. Therefore, operability is significantly improved without a cost increase. Such a technique of the related art is disclosed in Japanese Unexamined Patent Application Publication No. 8-078934.

SUMMARY OF THE INVENTION

However, in a case where transmission and reception signals based on the built-in antenna 910 are made transmittable with the external antenna 904 through the electric coupling portion 908 as in the case of the antenna extension device 900, there has been a problem that the frequency characteristic of the built-in antenna 910 is changed by putting the electric coupling portion 908 close to the built-in antenna 910. Therefore, it leads to a problem that a transmission characteristic is deteriorated and as a result, transmission loss occurs.

The present invention is made in view of such a situation of the related art and provides a wireless module in which a transmission loss between an antenna provided in the wireless module and a coupler is reduced.

The present invention provides a wireless module including a wireless module main body including a first insulating substrate and a first antenna formed by a conductor pattern on the first insulating substrate, and a coupler including a second insulating substrate arranged so as to face the first insulating substrate and a second antenna formed by a conductor pattern on the second insulating substrate, wherein an output signal is output from the coupler, wherein the second antenna includes a feeding point, a connection terminal to which an external antenna is connectable is formed in the second insulating substrate, the connection terminal being connected to a feeding point for the second antenna, a portion of the conductor pattern in the first antenna and a portion of the conductor pattern in the second antenna are configured so as to face each other, a resonant frequency of the second antenna is set to be higher than a resonant frequency of the first antenna, and the resonant frequency of the second antenna is set so that a transmission frequency characteristic from the first antenna to the second antenna matches a frequency characteristic of the resonant frequency of the first antenna.

In the wireless module configured in such a way, since the resonant frequency of the second antenna is set to be higher than the resonant frequency of the first antenna, it is possible to prevent the frequency of the output signal from the coupler from decreasing when the first insulating substrate and the second insulating substrate are caused to face each other. In addition to that, by setting the resonant frequency of the second antenna to an adequate frequency, it is possible to cause the transmission frequency characteristic from the first antenna to the second antenna to match the frequency characteristic of the resonant frequency of the first antenna. Therefore, it is possible to cause the frequency of the output signal output from the coupler to accurately match the resonant frequency of the first antenna, and hence, it is possible to reduce a transmission loss between the first antenna and the second antenna.

In addition, in the above-mentioned configuration, it is preferable that, in the wireless module according to the present invention, the portion of the conductor pattern in the first antenna and the portion of the conductor pattern in the second antenna facing each other have shapes equal to each other.

In the wireless module configured in such a way, since the conductor pattern in the first antenna and the conductor pattern in the second antenna, which preferably have the equal shapes, are caused to face each other, it is possible to efficiently electric-field-couple the first antenna and the second antenna to each other.

In addition, in the above-mentioned configuration, it is preferable that, in the wireless module according to the present invention, the first antenna and the second antenna include respective open ends, and the conductor patterns having the equal shapes are located near the respective open ends.

In the wireless module configured in such a way, since the conductor patterns preferably having the equal shapes are located near the open end portions whose electric field strengths are strong, it is possible to more strongly electric-field-couple the first antenna and the second antenna to each other.

In addition, in the above-mentioned configuration, it is preferable that, in the wireless module according to the present invention, the second insulating substrate is a flexible printed board having a film shape.

In the wireless module configured in such a way, since the second insulating substrate is the flexible printed board having the film shape, it becomes possible to make the wireless module thinner.

In addition, in the above-mentioned configuration, it is preferable that, in the wireless module according to the present invention, within the conductor pattern forming the second antenna, a portion of the conductor pattern, located near the feeding point for the second antenna, is short-circuited by a short-circuit line.

In the wireless module configured in such a way, since, within the conductor pattern forming the second antenna, a portion of the conductor pattern, located near the feeding point at which an electric field strength is weak, is short-circuited by the short-circuit line, it is possible to easily set the resonant frequency of the second antenna to be higher than the resonant frequency of the first antenna without influence on the amplitude of electric field coupling.

In addition, in the above-mentioned configuration, it is preferable that, in the wireless module according to the present invention, the coupler is attached to the first insulating substrate.

In the wireless module configured in such a way, since the coupler is attached to the first insulating substrate in the wireless module main body, it becomes easy to handle therewith.

In addition, in the above-mentioned configuration, it is preferable that, in the wireless module according to the present invention, the wireless module main body and the coupler are each separately provided.

In the wireless module configured in such a way, since the wireless module main body and the coupler are each separately provided, it is possible to freely select a method for causing the wireless module main body and the coupler to face each other.

BRIEF DESCRIPTION OF THE DRAWINGS

FIGS. 4A and 4B are enlarged plan views of the wireless module and the coupler;

FIG. 5 is a perspective view when the wireless module and the coupler are combined;

FIGS. 7A to 7C are diagrams illustrating relationships of resonant frequencies of individual antennas when the wireless module and the coupler are combined;

FIG. 8 is a side view of a wireless module according to an example of a modification to the embodiment of the present invention; and FIG. 9 is a pattern diagram of an antenna extension device according to the related art.

DESCRIPTION OF THE PREFERRED EMBODIMENTS

Embodiment

Hereinafter, an embodiment of the present invention will be described with reference to drawings.

First, a configuration of a wireless module 100 according to the embodiment will be described using FIG. 1 and FIGS. 2A and 2B.

Figure 1:
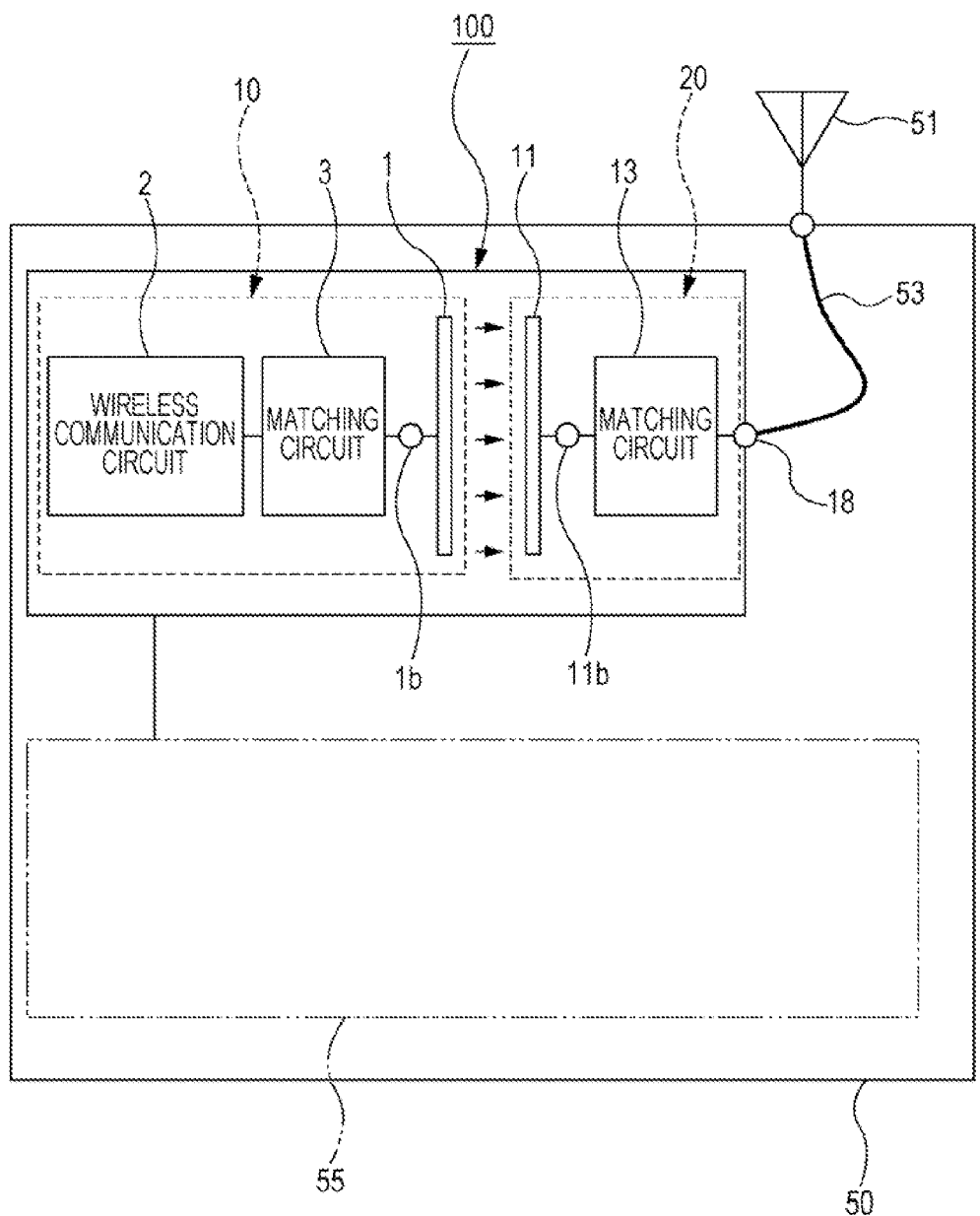
FIG. 1 is a block diagram illustrating a configuration of a wireless module according to an embodiment of the present invention.
Figure 2A:
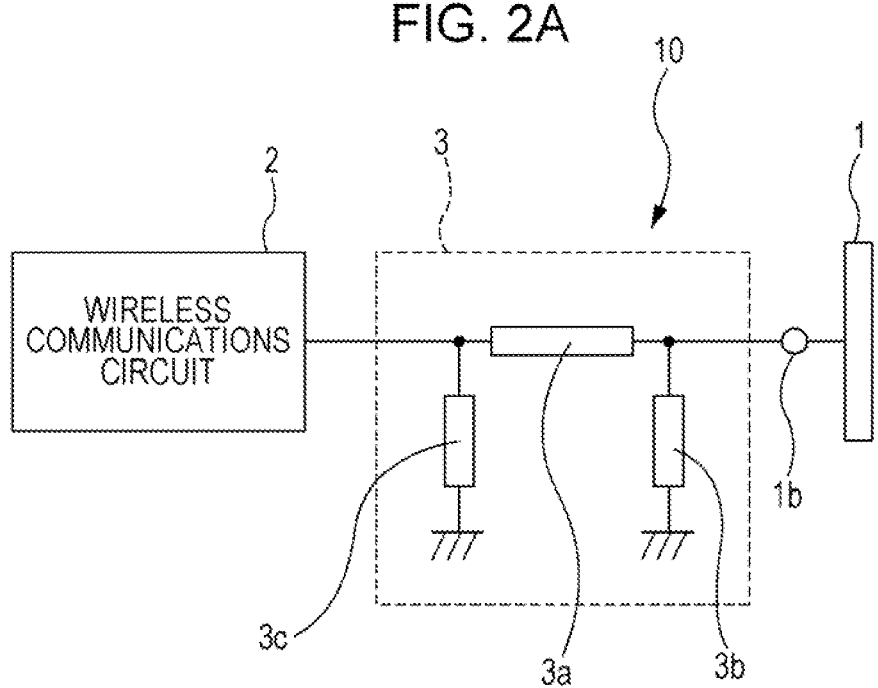
FIGS. 2A and 2B are block diagrams of a wireless module main body and a coupler.
Figure 2B:
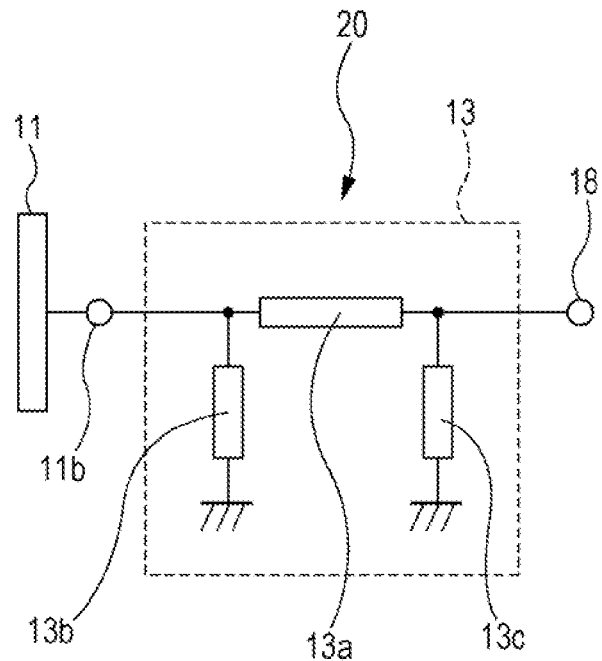

FIG. 1 is a block diagram illustrating the configuration of the wireless module 100 according to the embodiment within a set device 50, and FIGS. 2A and 2B are block diagrams of a wireless module main body 10 and a coupler 20.

The wireless module 100 is a module for an electronic device, used for transmitting and/or receiving a signal of a several GHz band, such as a wireless LAN device or a Bluetooth (registered trademark) device, and is arranged and used within the set device 50 as illustrated in FIG. 1. The set device 50 is a personal computer peripheral device such as a printer, and configured so as to perform communication with a wireless communication device such as a personal computer through the wireless module 100.

As illustrated in FIG. 1, the set device 50 includes a set-side device 55. In a case where the set device 50 is, for example, the printer, the set-side device 55 is a device configured so as to perform various types of processing relating to the printer. The set-side device 55 is connected to the wireless module 100 within the set device 50. In addition, an external antenna 51 is provided in the set device 50, and the external antenna 51 is connected to a connection terminal 18 provided in the wireless module 100, through a cable 53.

The set device 50 is usually configured so as to perform wireless communication with the personal computer or the like using an antenna within the wireless module 100. However, if the set device 50 is, for example, a business-use large-sized printer, in a case where the wireless module 100 is installed in the vicinity of the metal chassis of the set-side device 55, in some cases a trouble occurs in the wireless communication with an external personal computer or the like. The reason is that a radio wave the wireless module 100 transmits or receives is shielded by the metal chassis of the set-side device 55. If it is possible to install the wireless module 100 on a top plate or the like close to the outside of the set device 50, there is no trouble in the wireless communication with the external personal computer or the like. However, in many cases it is difficult to do this, owing to the configuration of the set device 50. Therefore, in the embodiment of the present invention, a configuration is adopted where the external antenna 51 exposed on the outside of the set device 50 is provided in the set device 50 and it becomes possible to perform wireless communication with the external personal computer or the like through the external antenna 51.

As illustrated in FIG. 1, the wireless module 100 includes the wireless module main body 10 and the coupler 20.

In the present embodiment, a configuration is adopted so that it is possible to use the external antenna 51 by combining the wireless module main body 10 and the coupler 20 in a case where, in the set device 50, a trouble occurs in the wireless communication with the personal computer or the like. As a specific method therefor, in the wireless module 100, the wireless module main body 10 and the coupler 20 are electric-field-coupled to each other to transmit a signal.

The wireless module main body 10 includes a first antenna 1, a wireless communication circuit 2, and a matching circuit 3, and these are configured so as to be integrated with one another. In the wireless communication circuit 2, a circuit is formed using high-frequency components (not illustrated), and various types of processing for the wireless communication are performed. A feeding point 1b for the first antenna 1 is connected to the wireless communication circuit 2 through the matching circuit 3, and the matching circuit 3 is configured so as to match an impedance of the first antenna 1 and an impedance of the wireless communication circuit 2.

As illustrated in FIG. 2A, the matching circuit 3 includes a n-type circuit formed by a circuit element 3a, a circuit element 3b, and a circuit element 3c. One end of two ends of the circuit element 3a is connected to the feeding point 1b for the first antenna 1, and the other end is connected to the wireless communication circuit 2. In addition, one end of two ends of the circuit element 3b is connected to one end of the circuit element 3a, and the other end is grounded. Furthermore, one end of two ends of the circuit element 3c is connected to the other end of the circuit element 3a, and the other end is grounded. The circuit element 3a, the circuit element 3b, and the circuit element 3c each include a capacitor or an inductor, and the constants thereof are adjusted in response to a difference between the individual impedances of the first antenna 1 and the wireless communication circuit 2. Note that the circuit element 3b and the circuit element 3c may be open with no specific elements connected.

As illustrated in FIG. 1, the coupler 20 includes the second antenna 11, a matching circuit 13, and the connection terminal 18. A feeding point 11b for the second antenna 11 is connected to the connection terminal 18 through the matching circuit 13. The external antenna 51 is connected to the connection terminal 18 through the cable 53.

As illustrated in FIG. 2B, the matching circuit 13 includes a π-type circuit formed by a circuit element 13a, a circuit element 13b, and a circuit element 13c. One end of two ends of the circuit element 13a is connected to the feeding point 11b for the second antenna 11, and the other end is connected to the connection terminal 18. In addition, one end of two ends of the circuit element 13b is connected to one end of the circuit element 13a, and the other end is grounded. Furthermore, one end of two ends of the circuit element 13c is connected to the other end of the circuit element 13a, and the other end is grounded. The circuit element 13a, the circuit element 13b, and the circuit element 13c each include a capacitor or an inductor, and the constants thereof are adjusted in response to a difference between the individual impedances of the second antenna 11 and the external antenna 51. Note that the circuit element 13b and the circuit element 13c may be open with no specific elements connected.

Next, the individual specific structures of the wireless module main body 10 and the coupler 20 in the wireless module 100 according to the embodiment will be described with reference to FIGS. 3A and 3B and FIGS. 4A and 4B.

Figure 3A:
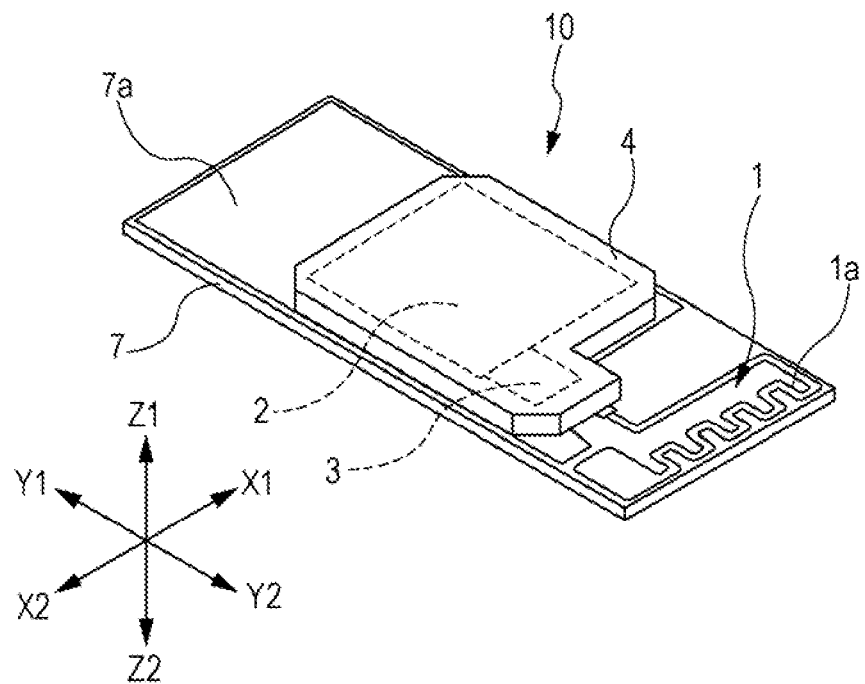
FIGS. 3A and 3B are perspective views of the wireless module and the coupler.
Figure 3B:
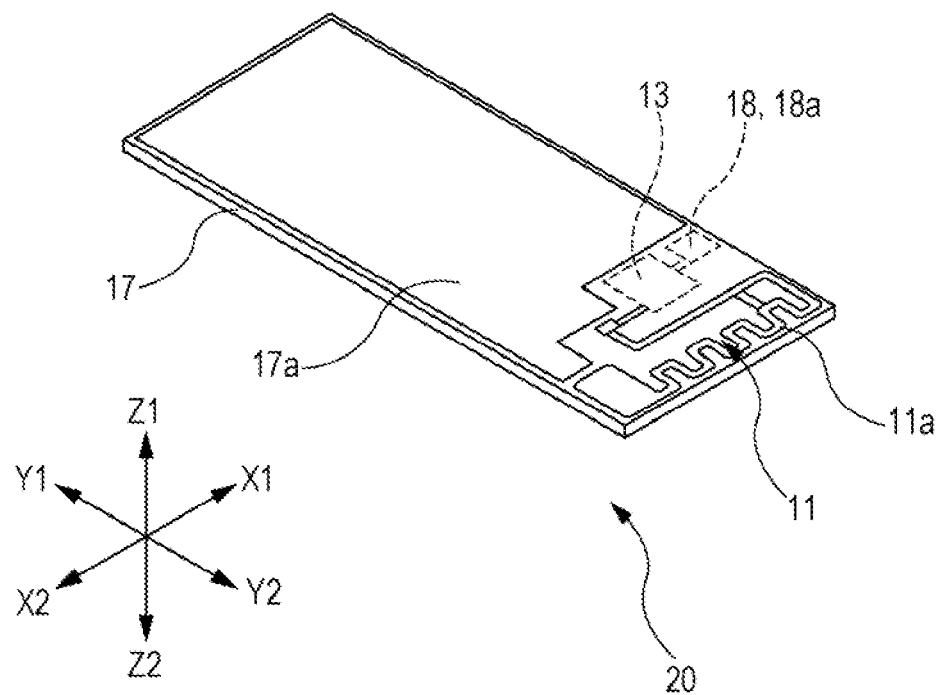

FIG. 3A is the perspective view of the wireless module main body 10, and FIG. 3B is the perspective view of the coupler 20. In addition, FIG. 4A is the enlarged plan view of the vicinity of the first antenna 1 in the wireless module main body 10, and FIG. 4B is the enlarged plan view of the vicinity of the second antenna 11 in the coupler 20.

As illustrated in FIG. 3A, the wireless module main body 10 includes a first insulating substrate 7, the first antenna 1 formed on the first insulating substrate 7, the wireless communication circuit 2, the matching circuit 3, and a shield cover 4. Note that a connection relationship between the first antenna 1, the wireless communication circuit 2, and the matching circuit 3 and the configuration of the matching circuit 3 are as described above.

As illustrated in FIG. 3A, the first antenna 1 is a pattern antenna formed in a surface on a Z1 side on the first insulating substrate 7, using a conductor pattern 1a. The shield cover 4 is attached to the wireless communication circuit 2 and the matching circuit 3 so as to prevent a high-frequency signal from infiltrating or leaking. In addition, in a region on the first insulating substrate 7, in which the first antenna 1 is not formed, a ground conductor 7a is formed. As a substrate material for the first insulating substrate 7, a glass epoxy resin or the like is used.

As illustrated in FIG. 4A, the conductor pattern 1a in the first antenna 1 has a meander shape having a plurality of bending portions 1d. The first antenna 1 includes the feeding point 1b at one end of two ends thereof, and preferably includes an open end portion 1c at the other end. So as to reduce the entire length of the conductor pattern 1a, the open end portion 1c preferably has a structure for having capacitance between the open end portion 1c and a ground. As the shape thereof, the conductor width of the open end portion 1c is preferably set to a wider width than another portion.

As illustrated in FIG. 3B, the coupler 20 includes a second insulating substrate 17, the second antenna 11 formed on the second insulating substrate 17, the matching circuit 13, and the connection terminal 18. The second antenna 11 is formed in a surface on the Z1 side of the second insulating substrate 17, and the matching circuit 13 and the connection terminal 18 are formed in a surface on the Z2 side of the second insulating substrate 17. In a region on the second insulating substrate 17, in which the second antenna 11 is not formed, a ground conductor 17a is formed. As a substrate material for the second insulating substrate 17, a glass epoxy resin or the like is used. Note that a connection relationship between the second antenna 11, the matching circuit 13, and the connection terminal 18 and the configuration of the matching circuit 13 are as described above.

As illustrated in FIG. 4B, the second antenna 11 is formed using a conductor pattern 11a on the second insulating substrate 17, in the same way as the first antenna 1. The conductor pattern 11a in the second antenna 11 has a meander shape having a plurality of bending portions 11d. The second antenna 11 includes the feeding point 11b at one end of two ends thereof, and includes an open end portion 11c at the other end. In the same way as the first antenna 1, so as to reduce the entire length of the conductor pattern 11a, the open end portion 11c preferably has a structure for having capacitance between the open end portion 11c and a ground. As the shape thereof, the conductor width of the open end portion 11c is preferably set to a wider width than another portion.

As illustrated in FIG. 4B, in the second antenna 11, within the conductor pattern 11a forming the second antenna 11, a portion of the conductor pattern 11a, located near the feeding point 11b, is preferably short-circuited by a short-circuit line 11e. Note that the action of the short-circuit line 11e will be described later.

It is assumed that a portion other than a portion leading from the short-circuit line 11e to the feeding point 11b within the conductor pattern 11a in the second antenna 11 is a B portion and a portion corresponding to the B portion within the conductor pattern 1a in the first antenna 1 is an A portion. The A portion and the B portion are indicated by two-dot chain lines in FIG. 4A and FIG. 4B. In the wireless module main body 10 and the coupler 20, a portion of the conductor pattern 1a in the first antenna 1 and a portion of the conductor pattern 11a in the second antenna 11, in other words, the A portion in FIG. 4A and the B portion in FIG. 4B preferably have shapes equal to each other. Furthermore, the conductor pattern 1a and the conductor pattern 11a preferably having equal shapes illustrated in the A portion in FIG. 4A and the B portion in FIG. 4B may be individually located near the open end portion 1c or the open end portion 11c. That reason will be described in and after the next section.

Next, the wireless module 100 in a case where the wireless module main body 10 and the coupler 20 are combined will be described with reference to FIG. 5 and FIGS. 6A and 6B.

Figure 6A:
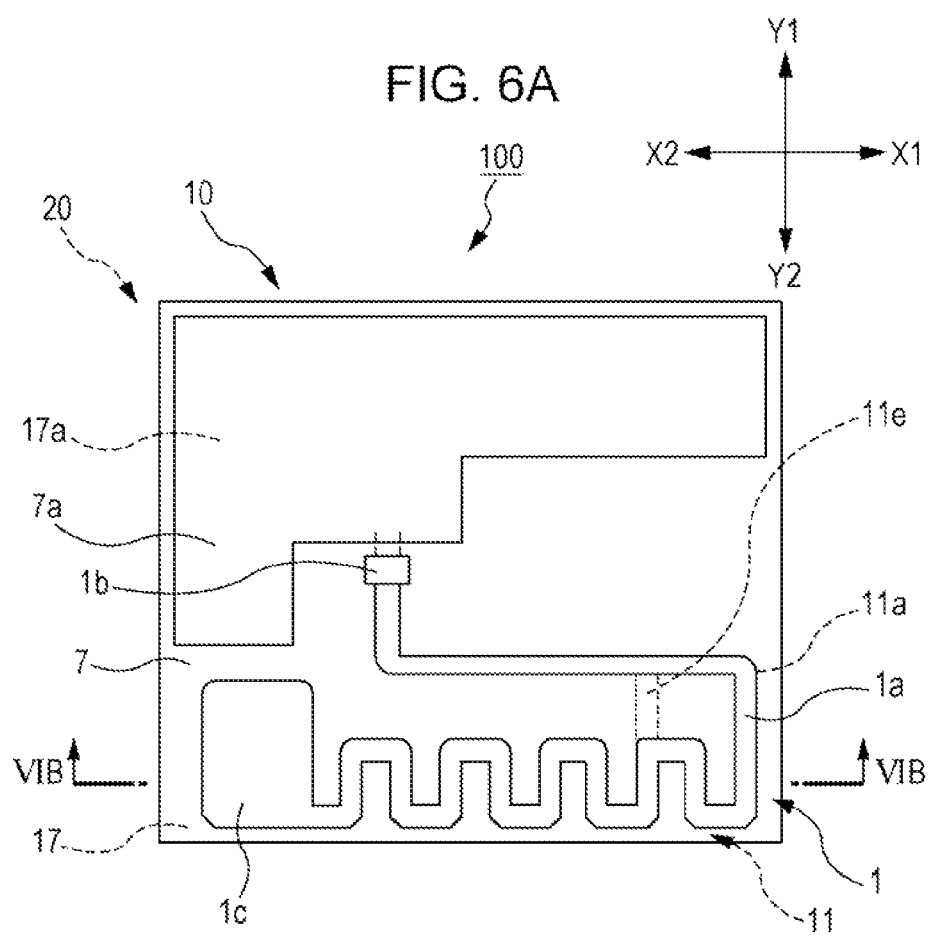
FIGS. 6A and 6B are an enlarged plan view and a side view when the wireless module and the coupler are combined.
Figure 6B:
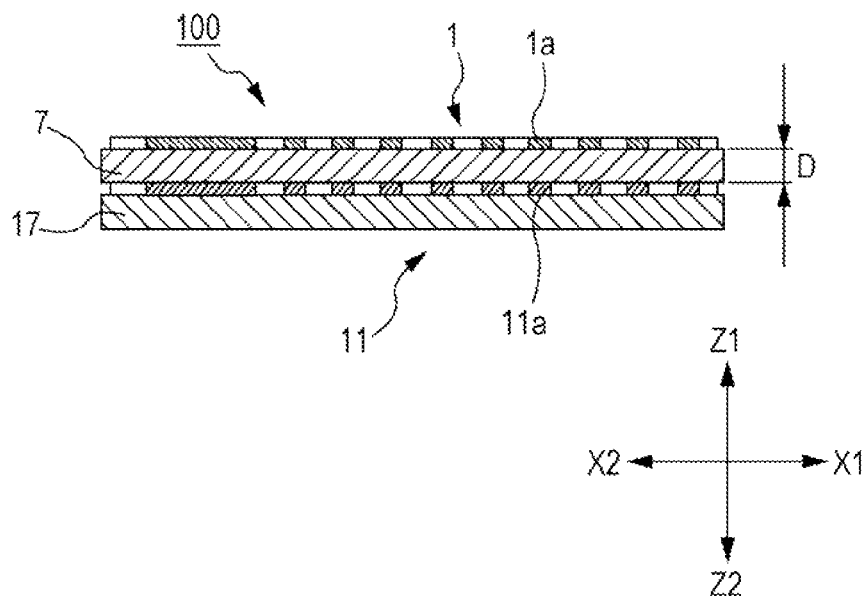

FIG. 5 is a perspective view when the wireless module main body 10 and the coupler 20 are caused to face each other, and FIGS. 6A and 6B are an enlarged plan view (FIG. 6A) and an enlarged side view (FIG. 6B) when the wireless module main body 10 and the coupler 20 are caused to face each other.

As illustrated in FIG. 5 and FIGS. 6A and 6B, in the wireless module 100, the second insulating substrate 17 in the coupler 20 is arranged so as to face the first insulating substrate 7 in the wireless module main body 10. In addition, at that time, the wireless module main body 10 and the coupler 20 are arranged so that a portion of the conductor pattern 1a in the first antenna 1 and a portion of the conductor pattern 11a in the second antenna 11, which preferably have shapes equal to each other, are caused to face each other. Note that, as illustrated in FIG. 5, since a connecting conductor pattern 18a is provided as the connection terminal 18, in the back surface (surface on a Z2 side) of the second insulating substrate 17 in the coupler 20, the cable 53 connected to the external antenna 51 is connectable using soldering or the like. Accordingly, in order to transmit an output signal of the wireless module main body 10 to the external antenna 51, it is not necessary to use a connecting connector such as, for example, an attachable and detachable coaxial connector.

As described above, a portion of the conductor pattern 1a in the first antenna 1 and a portion of the conductor pattern 11a in the second antenna 11 have equal shapes. In addition, the wireless module main body 10 and the coupler 20 are arranged so that a portion of the conductor pattern 1a in the first antenna 1 and a portion of the conductor pattern 11a in the second antenna 11, which preferably have shapes equal to each other, in other words, the A portion illustrated in FIG. 4A and the B portion illustrated in FIG. 4B are caused to face each other. As a result, electrostatic capacitance is generated between the conductor pattern 1a and the conductor pattern 11a, and it is possible to electric-field-couple the first antenna 1 and the second antenna 11 to each other.

In this way, since a configuration is adopted where the conductor pattern 1a in the first antenna 1 and the conductor pattern 11a in the second antenna 11, which preferably have equal shapes, are caused to face each other, it is possible to efficiently electric-field-couple the first antenna 1 and the second antenna 11 to each other. In addition, since the conductor pattern 1a and the conductor pattern 11a preferably having equal shapes may be located near the open end portion 1c and the open end portion 11c, respectively, whose electric field strengths are strong, it is possible to more strongly electric-field-couple the first antenna 1 and the second antenna 11 to each other.

Here, a distance between the first antenna 1 and the second antenna 11 is maintained by a predetermined distance D between antennas as illustrated in FIG. 5 and FIG. 6B. In other words, it is only necessary to hold the wireless module main body 10 and the coupler 20 so that the distance between the first antenna 1 and the second antenna 11 is maintained by the predetermined distance D between antennas. As illustrated in FIG. 6B, in the wireless module 100 of the embodiment, the plate thickness of the first insulating substrate 7 is used as the predetermined distance D between antennas. Accordingly, by managing the plate thickness of the first insulating substrate 7, it is possible to maintain the distance D between antennas at a given level.

Next, under the assumption that individual resonant frequencies of the first antenna 1 and the second antenna 11 are a resonant frequency Ft1 of the first antenna 1 and a resonant frequency Ft2 of the second antenna 11, respectively, a method for setting the resonant frequency Ft2 with respect to the resonant frequency Ft1 will be described using FIGS. 7A to 7C. Note that it is assumed that the frequency of the output signal of the wireless module 100 is an output signal frequency Fout.

In FIG. 7A to FIG. 7C, a lower limit frequency F1 of a useful frequency band of the wireless module 100, a center frequency F0 of the useful frequency band, and an upper limit frequency F2 of the useful frequency band are illustrated. In addition, the resonant frequency Ft1, the resonant frequency Ft2, and the output signal frequency Fout are illustrated within respective diagrams.

FIG. 7A is a diagram illustrating the frequency characteristic of the resonant frequency Ft1 of the first antenna 1, and FIG. 7B is a diagram illustrating the frequency characteristic of the resonant frequency Ft2 of the second antenna 11. In addition, FIG. 7C is a diagram illustrating a transmission frequency characteristic from the first antenna 1 to the second antenna 11 when the wireless module main body 10 and the coupler 20 are combined.

As illustrated in FIG. 7A, the resonant frequency Ft1 matches the center frequency F0 of the useful frequency band of the wireless module 100. If this frequency characteristic is transmitted, as the output signal frequency Fout without change, to the external antenna 51 illustrated in FIG. 1 and FIG. 5, there is no problem. However, in general, in a case where a signal is transmitted with two antennas caused to face each other, there occurs a frequency characteristic change that the frequency of an output signal becomes lower than the frequency of an average value of resonant frequencies in the individual two antennas. In addition, in a case where two antennas whose resonant frequencies are equal to each other are caused to face each other and a signal is transmitted, there occurs a frequency characteristic change that the output frequency thereof becomes lower than the resonant frequencies of the two antennas. Accordingly, even if the resonant frequency Ft2 is set to the same frequency as the resonant frequency Ft1, there occurs a problem that the output signal frequency Fout does not match the resonant frequency Ft1, and becomes lower than the resonant frequency Ft1.

In the present embodiment, so as to solve this problem, the resonant frequency Ft2 of the second antenna 11 is preferably set to be higher than the resonant frequency Ft1 of the first antenna 1. As a result, the output signal frequency Fout of the wireless module 100 does not become lower than the resonant frequency Ft1. In addition, as illustrated in FIG. 7C, the transmission frequency characteristic from the first antenna 1 to the second antenna 11 when the wireless module main body 10 and the coupler 20 are combined is able to be caused to match the frequency characteristic of the resonant frequency Ft1 illustrated in FIG. 7A. In other words, it is only necessary to set the resonant frequency Ft2 of the second antenna 11 so that the output signal frequency Fout of the wireless module 100 matches the resonant frequency Ft1 of the first antenna 1. Here, as illustrated in FIG. 7B, the resonant frequency Ft2 is adjusted to a set frequency F3 as an optimum frequency.

Note that, in the above description, for the sake of simplifying the description, the resonant frequency Ft1 of the first antenna 1 is caused to match the center frequency F0. However, in fact, depending on a difference between chassis within set devices into which wireless module main bodies are integrated, in some cases the frequency characteristic of an antenna in the wireless module main body is shifted. Therefore, in prospect of the shift of the frequency characteristic of that antenna, the resonant frequency is set to be shifted from the center frequency of the output signal frequency of the wireless module. Accordingly, in that case, the characteristic of FIG. 7A becomes different. However, in the present embodiment, the resonant frequency Ft2 of the second antenna 11 is preferably set so that the output signal frequency Fout of the wireless module 100 matches the resonant frequency Ft1 of the first antenna 1. Accordingly, the output signal frequency Fout matches the resonant frequency Ft1, and after that, the frequency of a signal after the wireless module main body 10 is integrated into the chassis of the set device 50 turns out to match the center frequency F0.

As described above, in the wireless module 100, the resonant frequency Ft2 of the second antenna 11 is set to be higher than the resonant frequency Ft1 of the first antenna 1. Therefore, it is possible to prevent the output signal frequency Fout from the coupler 20 from decreasing when the first insulating substrate 7 and the second insulating substrate 17 are caused to face each other. In addition to that, by setting the resonant frequency Ft2 of the second antenna 11 to the adequate set frequency F3, it is possible to cause the transmission frequency characteristic from the first antenna 1 to the second antenna 11 to match the frequency characteristic of the resonant frequency Ft1 of the first antenna 1. Therefore, it is possible to cause the output signal frequency Fout from the coupler 20 to accurately match the resonant frequency Ft1 of the first antenna 1, and hence, it is possible to reduce a transmission loss between the first antenna 1 and the second antenna 11.

Next, a specific method for setting the resonant frequency Ft2 of the second antenna 11 to be higher than the resonant frequency Ft1 of the first antenna 1 will be described using FIGS. 4A and 4B and FIGS. 7A to 7C.

In the wireless module 100 of the present embodiment, in order to set the resonant frequency Ft2 of the second antenna 11 to be higher than the resonant frequency Ft1 of the first antenna 1, the shape of the conductor pattern 11a forming the second antenna 11 is changed. Specifically, as illustrated in FIG. 4B, within the conductor pattern 11a, the short-circuit line 11e is preferably added to a portion of the conductor pattern 11a, located near the feeding point 11b, and a portion of the conductor pattern 11a is preferably short-circuited. This enables the length of the conductor pattern 11a to be reduced with respect to the conductor pattern 1a in the first antenna 1 illustrated in FIG. 4A. Accordingly, as illustrated in FIGS. 7A to 7C, it is possible to easily set the resonant frequency Ft2 of the second antenna 11 to be higher than the resonant frequency Ft1 of the first antenna 1. In addition, since, within the conductor pattern 11a forming the second antenna 11, a portion of the conductor pattern 11a, located near the feeding point 11b at which an electric field strength is weak, is preferably short-circuited, it is possible to set the resonant frequency Ft2 without influence on the amplitude of electric field coupling.

Next, the structure of a wireless module 200 serving as an example of a modification to the wireless module 100 according to the embodiment will be described with reference to FIG. 8.

A modification to the wireless module 100, based on the wireless module 200, is that the second insulating substrate 17 for forming a coupler 30 has a film shape, and other than that, the wireless module 200 is the same as the wireless module 100. Accordingly, as for an already-described content, the description thereof will be omitted.

As illustrated in FIG. 8, the coupler 30 in the wireless module 200 preferably uses a film-shaped flexible printed board 27, as the second insulating substrate 17. On the flexible printed board 27, a third antenna 21 formed by a conductor pattern 21a is formed. A portion of the conductor pattern 21a on the third antenna 21 is arranged so as to face a portion of the conductor pattern 1a on the first antenna 1. As a result, in the same way as the wireless module 100, electrostatic capacitance is formed between the conductor pattern 1a and the conductor pattern 21a, and the first antenna 1 and the third antenna 21 are electric-field-coupled to each other. Accordingly, the output signal of the wireless module 100 is output from the wireless module main body 10 through the coupler 20.

In a case of the wireless module 200, since the second insulating substrate 17 has the film shape, it becomes possible to make the wireless module 200 thinner than the wireless module 100.

As the wireless module 100 or the wireless module 200 of the present embodiment, it is only necessary for the first insulating substrate 7 and the second insulating substrate 17 to be arranged so as to face each other. In addition, as the product form of the wireless module, a product form where the coupler 20 or coupler 30 is attached to the wireless module main body 10 may be adopted, and a product form where the wireless module main body 10 and the coupler 20 or coupler 30 are each separately provided may be adopted.

In a case where the wireless module 100 or the wireless module 200 is viewed from a side surface, the product form where the coupler 20 or coupler 30 is attached to the wireless module main body 10 has such a shape as in FIG. 6B or FIG. 8. In this case, it may be only necessary to attach the second insulating substrate 17 to the back surface (a surface on a Z2 side) of the first insulating substrate 7 using an adhesive, an adhesive sheet, or the like (not illustrated). In the wireless module 100 or wireless module 200 configured in such a way, since the coupler 20 or coupler 30 is attached to the wireless module main body 10, it becomes easy to handle therewith.

In the product form where the wireless module main body 10 and the coupler 20 or coupler 30 are each separately provided, in a manufacturing process for the set device 50 illustrated in FIG. 1, it may be only necessary for the wireless module main body 10 and the coupler 20 or coupler 30 to be combined and integrated into the set device 50. In the wireless module 100 or wireless module 200 configured in such a way, since the wireless module main body 10 and the coupler 20 or coupler 30 are each separately provided, it is possible to freely select a method for causing the wireless module main body 10 and the coupler 20 or coupler 30 to face each other. Therefore, the degree of freedom of attachment increases.

As described above, in the wireless module of the present invention, since the resonant frequency of the second antenna is set to be higher than the resonant frequency of the first antenna, it is possible to prevent the frequency of the output signal from the coupler from decreasing when the first insulating substrate and the second insulating substrate are caused to face each other. In addition to that, by setting the resonant frequency of the second antenna to the adequate frequency, it is possible to cause the transmission frequency characteristic from the first antenna to the second antenna to match the frequency characteristic of the resonant frequency of the first antenna. Therefore, it is possible to cause the frequency of the output signal output from the coupler to accurately match the resonant frequency of the first antenna, and hence, it is possible to reduce a transmission loss between the first antenna and the second antenna.

The present invention is not limited to the description of the above-mentioned embodiment, and may be arbitrarily modified and implemented in a form offering the advantage thereof. While, in the wireless module of the present embodiment, as a method for setting the resonant frequency of the second antenna to be higher, a method for adding the short-circuit line to a portion of the conductor pattern is adopted, the method for setting the resonant frequency to be higher is not limited to this method. For example, a method for changing the constants of individual circuit elements in a matching circuit in a coupler may be performed.

In addition, while, in the wireless module of the present embodiment, the plate thickness of the first insulating substrate is used as a mechanism for maintaining a distance between the first antenna and the second antenna at a given level, another method may be adopted in a case of intending to change a distance between antennas. For example, a frame used for causing the first antenna to be spaced from the second antenna by a distance between antennas may be provided in the second insulating substrate forming the second antenna.

What is claimed is:
1. A wireless module comprising:
a wireless module main body including:
a first insulating substrate having a first upper surface and a first lower surface opposite to the first upper surface; and
a first antenna having a first resonant frequency and formed on the first upper surface, the first antenna having a first conductor pattern including a first meander shape; and
a coupler configured to output an output signal, the coupler including:
a second insulating substrate having a second upper surface and a second lower surface opposite to the second upper surface, the second upper surface facing the first lower surface of the first insulating substrate;
a second antenna having a second resonant frequency and formed on the second upper surface, the second antenna having a second conductor pattern including a second meander shape, the second antenna having a feeding point; and
a connection terminal formed in the second insulating substrate and connected to the feeding point of the second antenna, the connection terminal being connectable to an external antenna,
wherein a portion of the first conductor pattern and a corresponding portion of the second conductor pattern have substantially a same meander shape,
wherein the portion of the first conductor pattern and the corresponding portion of the second conductor pattern face each other via the first insulating substrate interposed therebetween such that the portion of the first conductor pattern and the corresponding portion of the second conductor pattern are superimposed on each other with a predetermined distance therebetween in a direction orthogonal to the first upper surface, and
wherein the second resonant frequency is set higher than the first resonant frequency such that a transmission frequency characteristic from the first antenna to the second antenna substantially matches a frequency characteristic of the first resonant frequency.

2. The wireless module according to claim 1, wherein each of the portion of the first conductor pattern and the corresponding portion of the second conductor pattern includes a respective open end portion having a width wider than other portions.

3. The wireless module according to claim 1, wherein each of the first antenna and the second antenna has an open end, and the portion of the first conductor pattern and the corresponding portion of the second conductor pattern are formed on respective open end sides of the first and second antennas.

4. The wireless module according to claim 1, wherein the second insulating substrate is a flexible printed board having a film shape.

5. The wireless module according to claim 1, wherein the coupler further includes a short-circuit line which short-circuits a part of the second conductor pattern on a feeding point side thereof.

6. The wireless module according to claim 1, wherein the coupler is attached to the first insulating substrate.

7. The wireless module according to claim 1, wherein the wireless module main body and the coupler are provided separately.

8. A wireless module comprising:
a wireless module main body including:
a first insulating substrate; and
a first antenna having a first conductor pattern including a meander shape formed on the first insulating substrate, the first antenna having a first feeding point at one end of the first conductor pattern and a first open end at another end thereof, the first antenna having a first resonant frequency; and
a coupler configured to output an output signal, the coupler including:
a second insulating substrate facing the first insulating substrate;
a second antenna having a second conductor pattern formed on the second insulating substrate so as to face the first conductor pattern via the first insulating substrate interposed therebetween, the second antenna having a second feeding point at one end of the second conductor pattern and a second open end at another end thereof, the second antenna having a second resonant frequency; and
a connection terminal formed in the second insulating substrate and connected to the second feeding point, the connection terminal being connectable to an external antenna,
wherein the first conductor pattern includes:
a first meander part having a meander shape;

a first remainder part which is a remainder of the first conductor pattern other than the first meander part, wherein the second conductor pattern includes:

a second meander part having a meander shape;

a second remainder part which is a remainder of the second conductor pattern other than the second meander part, wherein the first and second meander parts have substantially a same meander shape and face each other via the first insulating substrate interposed therebetween such that the first and second meander parts are superimposed on each other with a predetermined distance therebetween in a direction orthogonal to the first upper surface; and wherein the first and second remainder parts have respective shapes different from each other such that the second resonant frequency becomes higher than the first resonant frequency.

9. The wireless module according to claim 8, wherein the coupler further includes:

a short-circuit line which short-circuits the second part of the second conductor pattern on a feeding point side so as to set the second resonant frequency higher than the first frequency.

10. The wireless module according to claim 8, wherein a transmission frequency characteristic from the first antenna to the second antenna substantially matches a frequency characteristic of the first resonant frequency such that an output frequency of the output signal substantially matches the first resonant frequency.

11. The wireless module according to claim 8, wherein the first meander part of the first conductor pattern and the second meander part of the second conductor pattern include the first and second open ends, respectively.

12. The wireless module according to claim 8, wherein the first and second open ends include portions having a wider width than other portions of the first and second conductor patterns, respectively.

* * * * *